United States Patent [19]

McClean

[11] Patent Number: 5,897,805
[45] Date of Patent: Apr. 27, 1999

[54] LIQUID HEATING CONTROLS

[75] Inventor: John William McClean, Roselands, Australia

[73] Assignee: Breville Pty Ltd, Botany, Australia

[21] Appl. No.: 09/009,440

[22] Filed: Jan. 20, 1998

[51] Int. Cl.[6] ........................................ H05B 1/02
[52] U.S. Cl. ..................... 219/518; 219/494; 219/507; 219/441; 99/281; 392/441
[58] Field of Search ................................. 219/494, 497, 219/501, 507, 518, 441; 99/290–299, 300–306, 280, 281; 392/441, 442, 447

[56] References Cited

U.S. PATENT DOCUMENTS 4,848,151  7/1989  Bruder et al. ............................. 73/308
5,283,593  2/1994  Wehl ........................................ 346/140 R

FOREIGN PATENT DOCUMENTS

| 56-100234 | 8/1981 | Japan . |
| 62-129648 | 6/1987 | Japan . |
| 01227019 | 9/1989 | Japan . |
| 01254122 | 10/1989 | Japan . |
| 03112521 | 5/1991 | Japan . |
| 1439951 | 6/1976 | United Kingdom . |
| 1559076 | 8/1976 | United Kingdom . |
| 1515117 | 6/1978 | United Kingdom . |

*Primary Examiner*—Mark Paschall
*Attorney, Agent, or Firm*—Louis T. Isaf

[57] ABSTRACT

A switch control mechanism in a liquid boiling apparatus employs the lifting force of bubbles formed in the boiling liquid to actuate a switching system which controls the application of energy to boil the liquid.

8 Claims, 6 Drawing Sheets

LIQUID HEATING CONTROLS

TECHNICAL FIELD

The present invention relates to control means and in particular to controls for activating and/or deactivating the application of thermal energy to the heating of liquids.

BACKGROUND ART

In the field of heating water in domestic appliances a number of switch control systems are in use which include the use of temperature sensitive bimetallic strips to trigger a switch to open circuit an electrical supply to a heating element. Typically, the bimetallic strip is actuated by the temperature of steam rising from the boiling liquid which is directed to contact the bimetallic strip and thus trigger a switching mechanism.

It is also known to employ floats to trigger a switch to open circuit an electrical supply to a heating element to prevent, such as a kettle or urn, from boiling dry. The use of vibration sensors and ultrasonic wave reflection is also known in the control of apparatus for boiling water.

In contrast with these known arrangements the present invention employs the lifting force of bubbles which form in a boiling liquid to actuate a control system for applying thermal energy to the liquid.

DISCLOSURE OF INVENTION

In one aspect the present invention consists in a switch control mechanism adapted to control the application of thermal energy to heat and/or boil a liquid, said mechanism comprising movable means arranged to be acted upon by bubbles formed in a liquid as thermal energy is applied to the liquid whereby lifting forces are applied to the movable means by said bubbles to move said movable means to a location to effect switching to control the application of thermal energy to the liquid.

In another aspect the present invention provides a method of operating a switching means in a liquid heating environment comprising locating movable means in the liquid such that bubbles formed in the liquid, under the application of thermal energy to the liquid, causes the movable means to move to a position which effects operation of the switching means.

BRIEF DESCRIPTION OF DRAWINGS

The present invention will now be described by way of one example with reference to the accompanying drawings, in which.

BEST MODE FOR CARRYING OUT THE INVENTION

Figure 1:
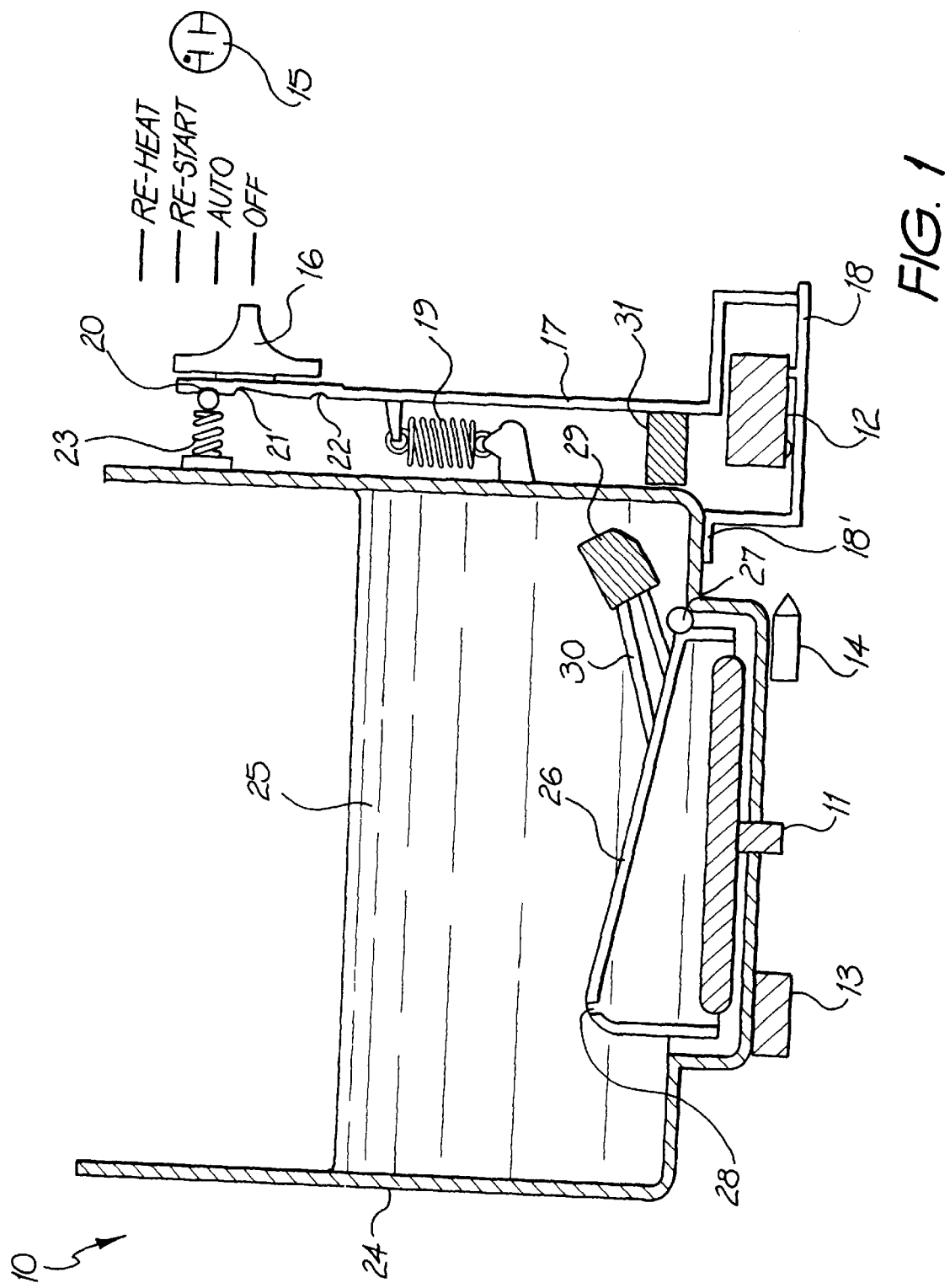
FIG. 1 is a cross-sectional schematic view of a domestic electric kettle incorporating a preferred embodiment of the present invention with its control switch positioned to open circuit the electrical supply to the heating element of the kettle.

The electrically powered water heating container or kettle 10 as shown in the drawings comprises an electrical water heating element 11 which is open and close-circuited to an electrical power supply via a microswitch 12. In accord with electrical authority requirements an auto reset thermal cut-out 13 is series connected in the power supply circuit to heating element 11 while a non-resetting thermal cut-out switch 14 is also in series with the heating element 11 as an overriding safety device.

Neon indicating light 15 is fitted in parallel with the heating element 11 to display when electrical energy is being supplied to heating element 11. Switch control knob 16 coupled to switch arm 17 effects opening and closing of microswitch 12. Microswitch 12 being in the open-circuited position in FIG. 1 resulting from the interaction between arm 17 and switch lever 18 of microswitch 12.

As shown in the drawings, arm 17 biases control knob 16 to the power off position under the action of spring 19 while there are three fixedly settable switch positions 20, 21 and 22 on arm 17 which are able to be held against the varying bias forces of spring 19 by means of their interaction with spring loaded detent 23.

Within container 24 there is shown a body of water 25. At the bottom of container 24 atop heating element 11 there is positioned a flap or cover 26 hinged at 27 to container 24.

The cover 26 can take numerous shapes but is schematically represented here as an inverted cup or container which surrounds heating element 11 having holes 28 for permitting the movement of liquid and bubbles from within and upwardly through holes 28 into the body of water 25.

Magnet 29 is mounted to the cover 26 via arm 30. Arm 17 carries a complementary magnet 31 which is adapted to interact with magnet 29 in the automatic boiling mode as depicted in FIG. 3 and to be removed from interaction upon switching to the re-start mode as shown in FIG. 4.

Figure 3:
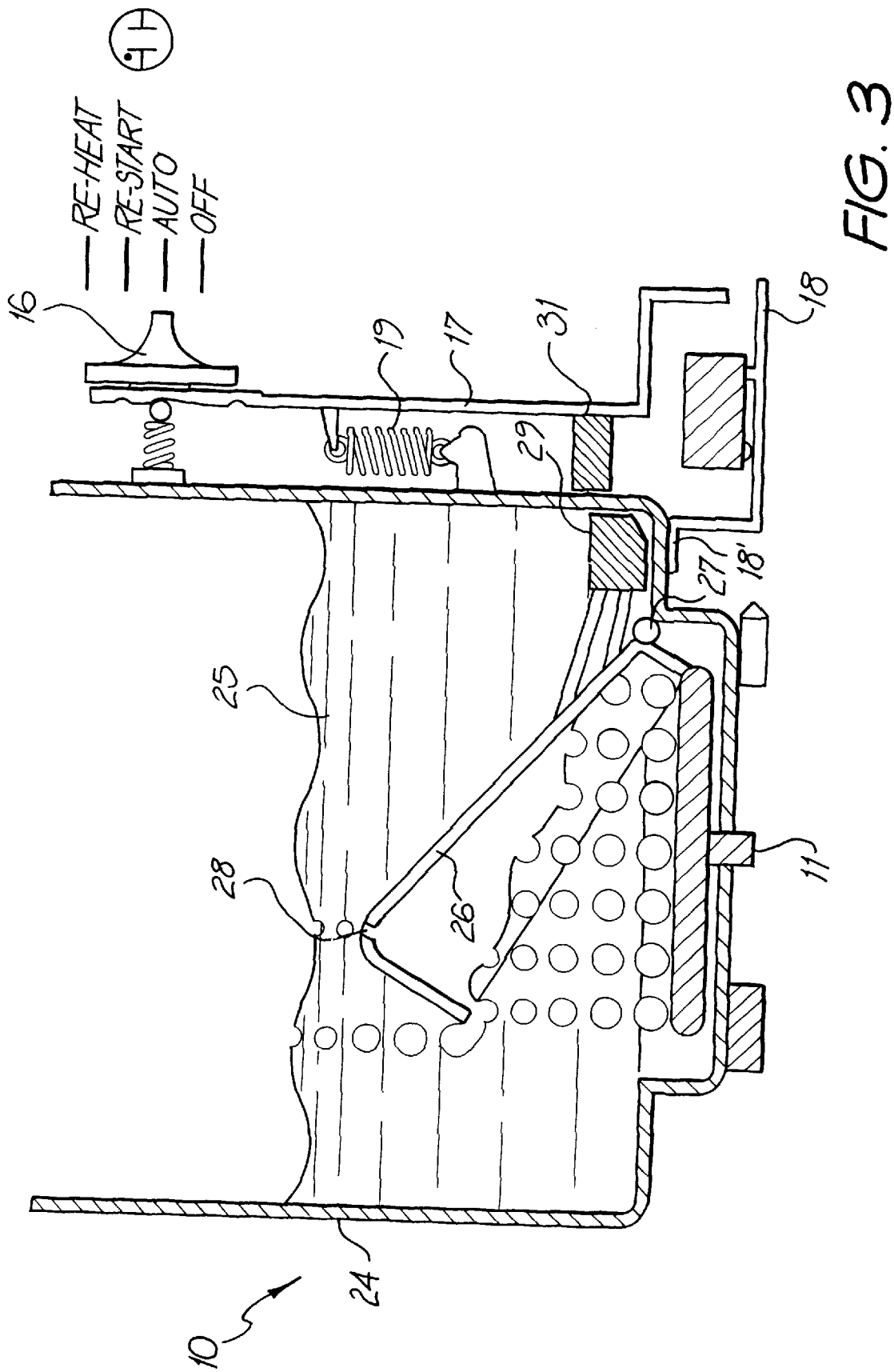
FIG. 3 is the same view as FIG. 2 but configured as when the kettle has boiled at the setting of FIG. 2.
Figure 4:
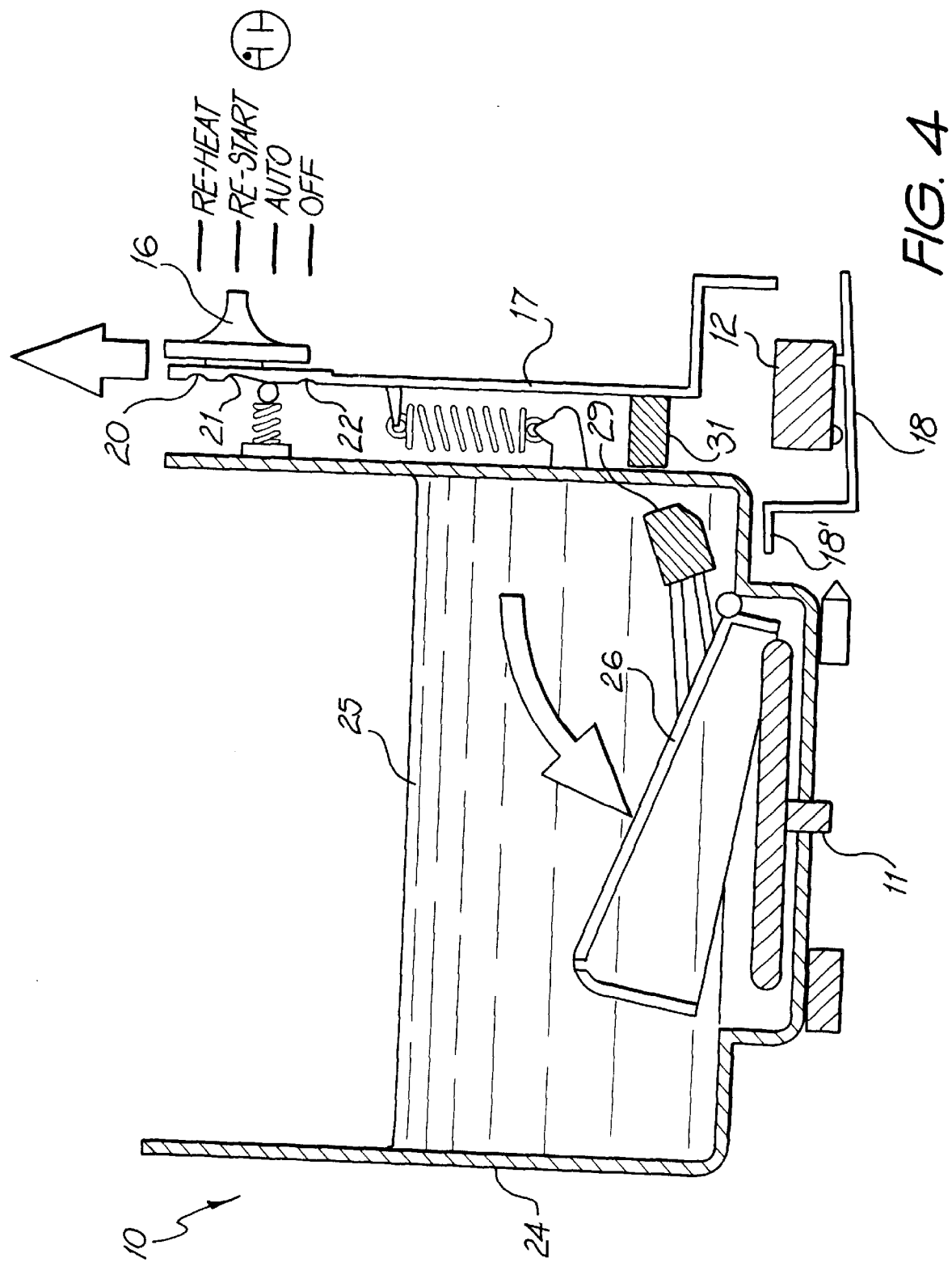
FIG. 4 is a schematic view of the kettle of FIG. 1 with its switch positioned to allow the kettle to re-boil.
Figure 5:
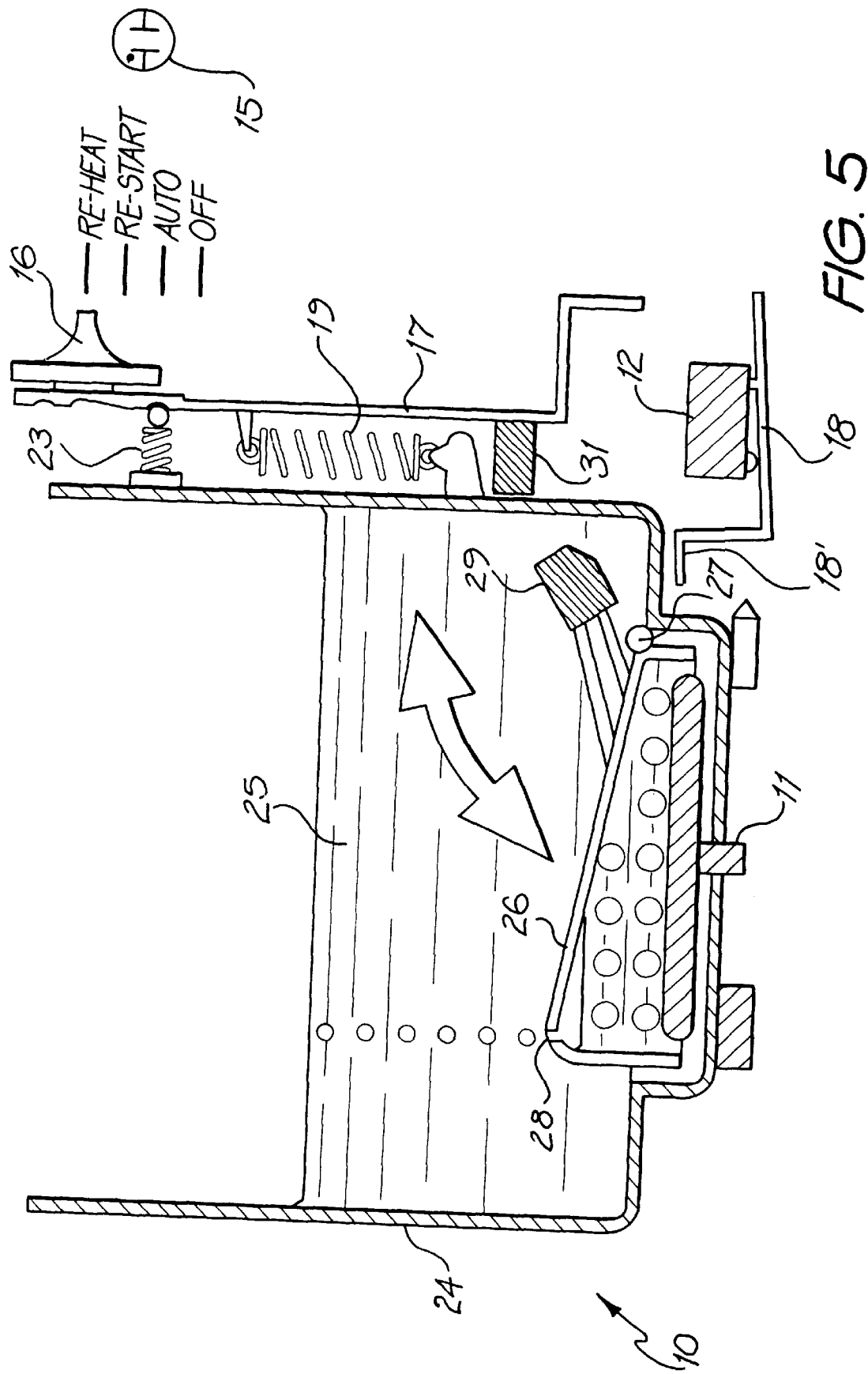
FIG. 5 shows the kettle of FIG. 1 with its switch positioned to enable the kettle to undergo a cycling operation between boiling, switching off and re-boiling.
Figure 6:
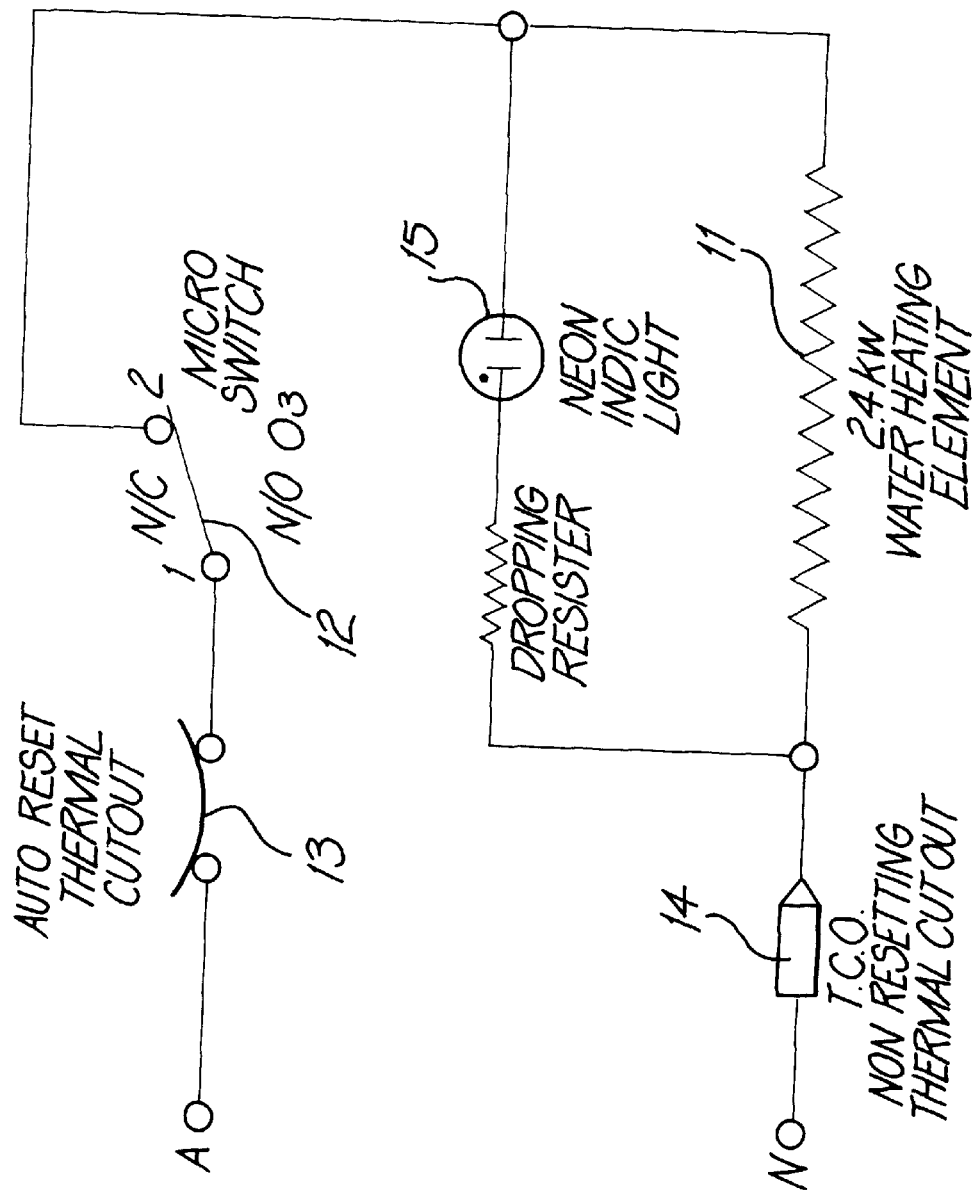
FIG. 6 is an electrical circuit diagram of the embodiment depicted in FIGS. 1–5.

End 18' of microswitch lever arm 18 is ferromagnetic and attracted by magnet 29 to open circuit the electrical supply to heating element 11 by controlling the position of microswitch 12 as shown in FIG. 3 and as would also occur in the configuration of FIG. 5 when the lifting force of the bubbles of the boiling water 25 raises cover 26 hence lowering magnet 29 toward end 18'.

The effective operation of this embodiment is clearly dependent upon a balancing between the submerged weight of the cover 26 or rather the balancing of the turning moments of cover 26 and magnet 29 about pivot 27 and the lifting force provided by bubbles in the boiling water 25 trapped within cover 26. By an appropriate balancing of those forces the pivoting of cover 26 can be set at predetermined boiling rates. Typically, for a domestic kettle or the like, the actuation of cover 26 to switch off the power supply to heating element 11 would be set to correspond to the force applied under the cover 26 by a rolling boil.

As the water 25 begins to boil, the bubbles that are formed under cover 26 readily pass through holes 28 so that when the intensity of the boiling action is such that the lifting force applied to cover 26 is no longer balanced by the counter-acting turning moment about pivot 27 then cover 26 will move upwardly as shown in FIG. 3.

Figure 2:
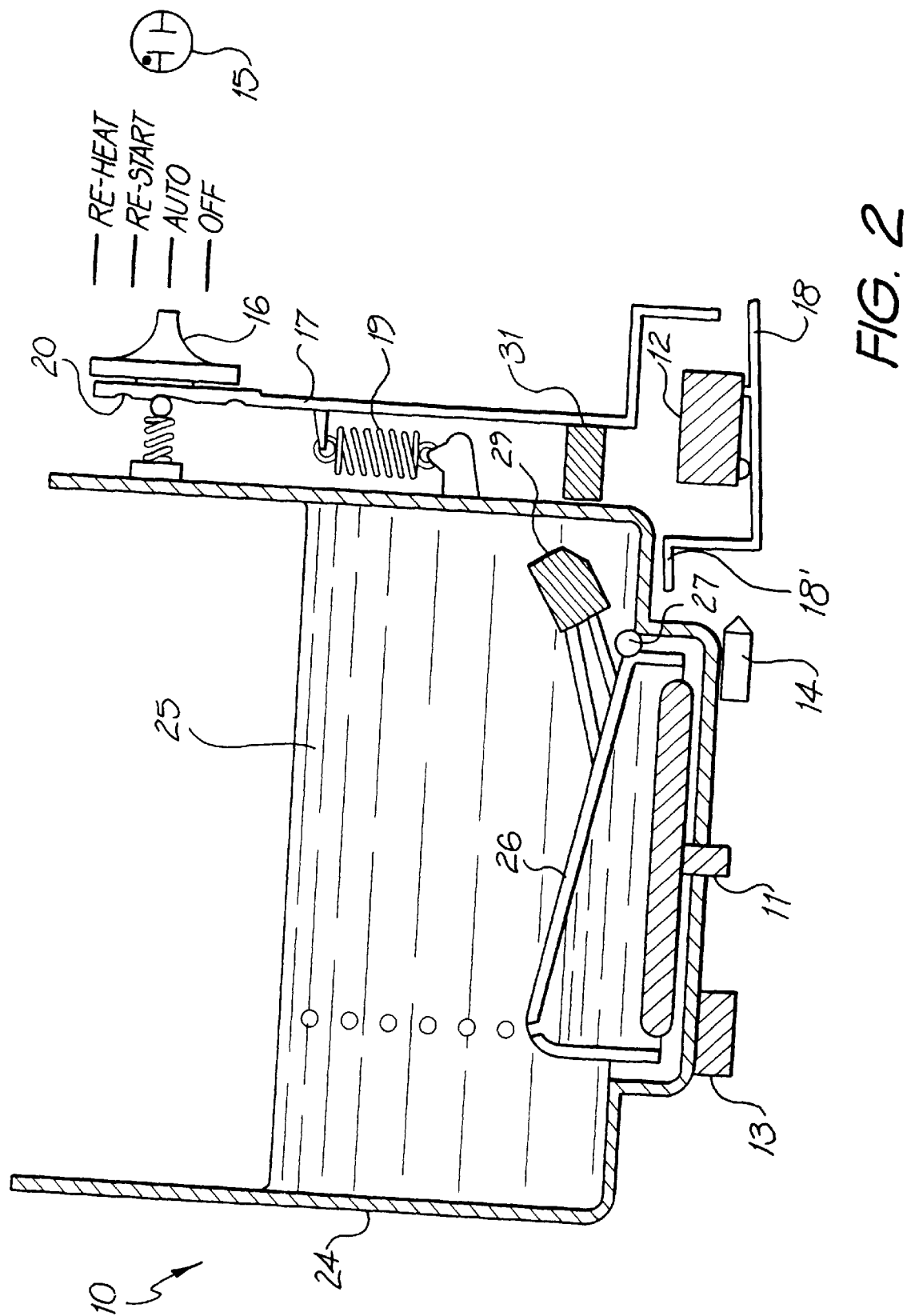
FIG. 2 is the same view as FIG. 1 with the control switch positioned to close circuit the electrical supply to the heating element.

Once the boiling action and bubble force under cover 26 are reduced and the relative position of magnets 29, 31 is not such as to hold cover 26 in its upward position that cover will then fall back to the position shown in FIGS. 1, 2 and 5 of the drawings.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

I claim:

1. A switch control mechanism adapted to control the application of thermal energy to heat and/or boil a liquid, said mechanism comprising movable means arranged to be acted upon by bubbles formed in a liquid as thermal energy is applied to the liquid whereby lifting forces are applied to the movable means by said bubbles to move said movable means to a location to effect switching to control the application of thermal energy to the liquid.

2. A switch control mechanism as claimed in claim 1 wherein the movable means comprises a pivotally mounted flap or inverted container.

3. A mechanism as claimed in claim 2 wherein the container or flap comprises at least one opening in at least one wall to enable fluid transfer from inside to outside of the container.

4. A mechanism as claimed in claim 3 wherein the at least one opening is sized to release the lifting force of the bubbles on the container to prevent switching up to the point where the liquid attains a predetermined boiling rate.

5. A mechanism as claimed in claim 1 wherein the movable means is coupled to a magnetic material which undergoes complementary movement with the movable means.

6. A mechanism as claimed in claim 5 wherein the magnetic material is adapted to interact with at least one other magnetic material or magnetically inductive material to control the switching.

7. A mechanism as claimed in claim 1 comprising means for setting a plurality of predetermined switching functions.

8. A method of operating a switching means in a liquid heating environment comprising locating movable means in the liquid such that bubbles formed in the liquid, under the application of thermal energy to the liquid, causes the movable means to move to a position which effects operation of the switching means.

* * * * *